(12) United States Patent
Hu

(10) Patent No.: US 8,462,704 B2
(45) Date of Patent: Jun. 11, 2013

(54) ENABLING INTEROPERABILITY OF DUAL-RADIO AND SINGLE-RADIO DEVICES FOR VEHICULAR MULTI-CHANNEL OPERATIONS

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 269 days.

(21) Appl. No.: 12/907,664

(22) Filed: Oct. 19, 2010

(65) Prior Publication Data
US 2011/0090847 A1    Apr. 21, 2011

Related U.S. Application Data

(60) Provisional application No. 61/252,849, filed on Oct. 19, 2009.

(51) Int. Cl.
*H04J 1/16*    (2006.01)
(52) U.S. Cl.
USPC .......................................... 370/328
(58) Field of Classification Search
USPC ........................................... 370/328
See application file for complete search history.

(56) References Cited

U.S. PATENT DOCUMENTS

2008/0232309 A1* 9/2008 McNew et al. ............... 370/329
2008/0232433 A1* 9/2008 McNew et al. ............... 375/140

OTHER PUBLICATIONS

Jiang, et. al. "IEEE 802.11p: Towards an International Standard for Wireless Access in Vehicular Environments" IEEE 2008.*
Zhu, et. al. "MAC for Dedicated Short Range Communications in Intelligent Transport System" IEEE Communications Magazine. Dec. 2003.*

* cited by examiner

*Primary Examiner* — Jason Mattis
*Assistant Examiner* — Stephen J Clawson
(74) *Attorney, Agent, or Firm* — Hogan Lovells US LLP

(57) ABSTRACT

Methods and systems are disclosed for interoperations between single-radio (channel switching) devices, dual radio devices, and single-radio (always-on) devices in radio communication systems, both with and without a safety channel. The methods and systems may be applied in communication systems for wireless access in vehicular environments (WAVE), such as those according to IEEE 802.11p. When there is a safety channel, some embodiments add a Safety Channel Interval within an operation period. Other embodiments disclose how various device types can operate to coordinate safety message transmissions, both with and without a safety channel.

16 Claims, 12 Drawing Sheets

ENABLING INTEROPERABILITY OF DUAL-RADIO AND SINGLE-RADIO DEVICES FOR VEHICULAR MULTI-CHANNEL OPERATIONS

RELATED APPLICATION

The present application relates to and claims the benefit of priority to U.S. Provisional Patent Application No. 61/252,849 filed Oct. 19, 2009 which is hereby incorporated by reference in its entirety for all purposes as if fully set forth herein.

BACKGROUND OF THE INVENTION

The present invention relates to interoperability among various wireless devices for vehicular communications, and, more particularly, to enabling interoperability of dual-radio and single-radio devices for vehicular multi-channel operations.

Referring now to FIG. 1, the problem of interoperability among various wireless devices for vehicular communications is illustrated. There are two types of devices in close vicinity:

1) Legacy single-radio devices 102 that operate on the control channel (channel 176 in the US) for support both safety application and control of service applications and a service channel for support data delivery of service applications through periodic channel switching, and 2) Advanced dual-radio devices 104 that tune one of their radios always on the safety channel (channel 172 in the US) and use the other radio switching channels between the control channel (channel 176) and a service channel to support non-safety service applications.

Note that the Control Channel (CCH) Interval of the advanced dual-radio devices would be smaller (or much smaller) than that of the legacy single radio devices, since all safety message communications should use the dedicated Safety Channel and only the control message communications for support service application should be on the CCH, as opposed to the legacy single radio devices that have to provide supports for safety applications and control of service application on the CCH. A smaller CCH interval of the advanced dual-radio devices allows a larger SCH interval that can more effectively support data delivery of service applications.

A dedicated radio of the advanced dual-radio device that is always on the Safety channel allows the safety-critical communications to be conducted on a much less congested RF channel such that the packet delivery performance can be significantly improved.

When the legacy single radio devices and the advanced dual-radio devices are communicating in close proximity, safety-critical messages communications can not be effectively conducted among these different types of devices due to the fact that the specifications of channel operation of these devices are not fully interoperable.

Due to the longer length of the CCH interval of the single-radio device compared to the one of the dual-radio devices, the safety message transmitted by the legacy single-radio devices on the CCH may not be received by the dual-radio devices in a timely manner.

Since the advance dual-radio devices transmit the safety messages on the Safety channel that the legacy single-radio devices do not tune to, those safety messages on the safety channel will not be received by the legacy single-radio devices.

What is desired is a method for enabling interoperability among the legacy and advanced wireless vehicular devices for ensuring communication reliability of safety-critical applications, while maintaining the desirable advantages of these devices (i.e. low-cost, simple operations for the legacy devices, and higher performance and spectrum efficient for the advanced devices).

SUMMARY OF THE INVENTION

According to the present invention, a method for interoperations between single-radio (channel switching) devices and single-radio (always-on) devices comprises single-radio (always-on) devices keep announcing safety messages on the safety channel at any time and keep monitoring packet transmissions on the safety channel at all times when it not transmitting in a normal mode; single-radio (channel switching) devices announce safety messages on the safety channel and keep monitoring packet transmissions on the safety channel during a safety channel interval; and once a single-radio (always-on) device detects the existence of a single-radio (channel-switching) device after successfully receiving at least one safety message transmitted by the single-radio (channel-switching) device during the safety channel interval, it enters to an interoperation mode, in which the single-radio (always-on) device shall transmit safety messages at least during the safety channel interval of the single-radio (channel-switching) device.

Methods for interoperations between single-radio devices and dual-radio devices, with and without a safety channel, are also disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
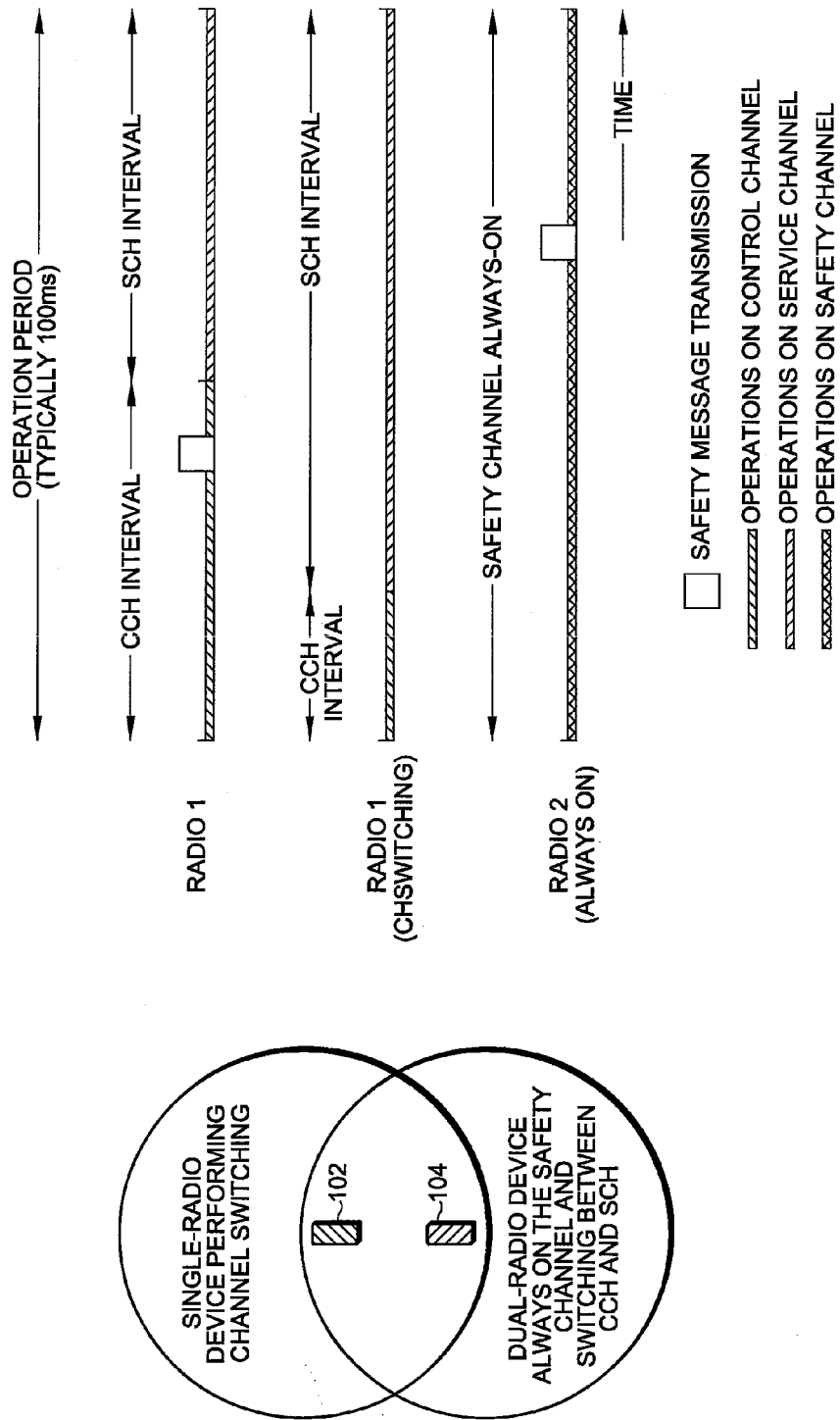
FIG. 1 illustrates the interoperability problem among various wireless devices for vehicular communications.

Interoperability among the dual-radio and single-radio devices is now described, including interoperability requirements.

Interoperability is required among dual-radio devices that are:
 a. Radio 1: Always on the safety channel for the communications of safety applications
 b. Radio 2: Always on either Control channel or Service channel, or switching between Control channel and service channel, to support services and other control applications.

Interoperability is also required among dual-radio devices that are:
 a. Radio 1: Always on the control channel for the communications of safety applications
 b. Radio 2: Always on the services channel to support services and other control applications.

Interoperability is also required among single-radio devices that are always on the safety channel.

Interoperability is also required among single-radio devices that are always on the control channel.

Interoperability is also required among single-radio devices that are switching between the safety channel, control channel, and the service channel.

Interoperability is also required among single-radio devices that are switching between the control channel and the service channel.

When the safety channel is available, it is required that all devices shall only use the safety channel for support safety applications.

Therefore in this case interoperability is required between dual-radio devices that are:
 a. Radio 1: Always on the safety channel for the communications of safety applications.
 b. Radio 2: Always on either control channel or service channel, or switching between control channel and service channel, to support services and other control applications.

Interoperability in this case is also required between single-radio devices that are always on the safety channel.

Interoperability in this case is also required between single-radio devices that are switching between the safety channel, control channel, and the service channel.

One the other hand, when the safety channel is not available the control channel shall be used to support the safety applications.

Therefore in this case interoperability is required between in this case between dual-radio devices that are:
 a. Radio 1: Always on the control channel for the communications of safety applications
 b. Radio 2: Always on the services channel to support services and other control applications.

Interoperability in this case is also required between single-radio devices that are always on the control channel.

Interoperability in this case is also required between single-radio devices that are switching between the control channel and the service channel.

Interoperability among radio devices that may use a different channel for safety initially is not addressed, since they will converge to use the safety channel if the safety channel is available or the control channel (when the safety channel is not available) for safety applications.

Interoperability issues for these two cases are addressed: the safety channel (channel 172) is available; and the safety channel is NOT available.

Interoperability when the safety channel is available is now addressed

It is required that when the safety channel is available, all devices shall only use the safety channel for support safety applications. Therefore the types of devices that need to interoperable in this case are dual-radio devices that are (Radio 1) always on the safety channel for the communications of safety applications; and (Radio 2) always on either the control channel or service channel, or switching between the control channel and service channel, to support services and other control applications. Single-radio devices that are always on the safety channel and single-radio devices that are switching between the safety channel, control channel, and the service channel also need to be interoperable.

A proposed scheme for interoperability according to the present invention is now described, including allocating a "Safety Channel Interval" in the operation periods. A "Safety Channel Interval" is therefore added to enable the necessary interoperability among different devices.

Allocation for single-radio devices performing channel switching is now described.

Figure 2:
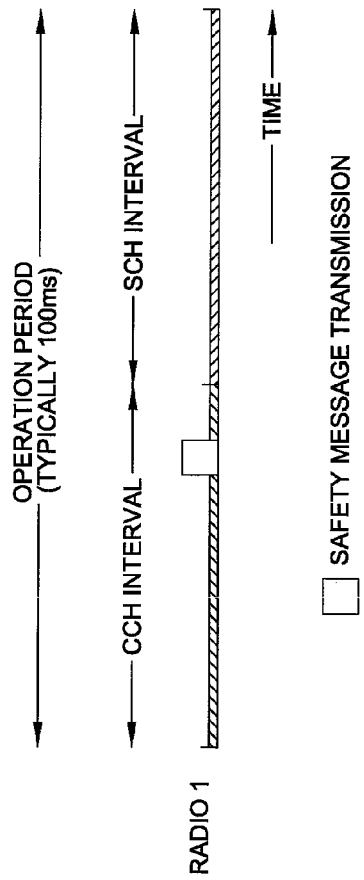
FIG. 2 illustrates current (state of the art) allocation of channel operation intervals within an operation period for the single-radio devices that perform channel switching.
Figure 2:
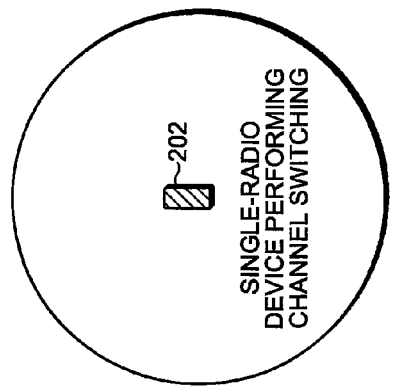

FIG. 2 shows the current allocation of channel operation interval within an operation period for the single-radio devices 202 that perform channel-switching. Only operation intervals for the control channel and the service channel are allocated (i.e. CCH interval and SCH interval). Communications for supporting safety applications are conducted within the CCH interval, mixing with communications for supporting services applications (on the control channel).

Figure 3:
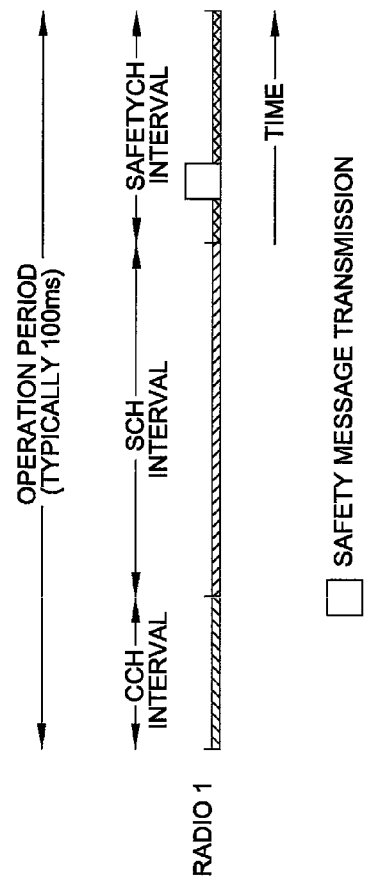
FIG. 3 illustrates a proposed allocation of channel operation intervals within an operation period for the single-radio devices that perform channel switching by adding a SafetyCH interval for dedicated communications of the safety channel according to the present invention.
Figure 3:
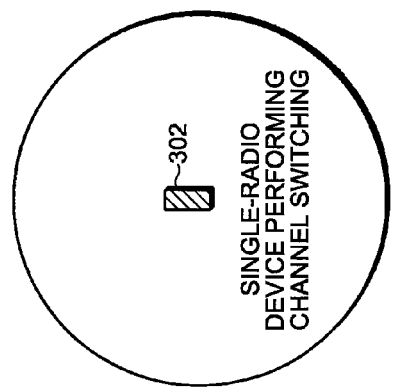

FIG. 3 shows the newly proposed allocation of channel operation intervals within an operation period for the single radio devices 302 that perform channel switching. A new operation interval for the safety channel (SafetyCH Interval) is allocated together with the control channel and the service channel intervals. Communications for supporting safety applications are conducted on the safety channel within the dedicated SafetyCH Interval, without mixing with communications for supporting services applications.

The CCH interval for communications on the control channel is reduced as compared to the one in the current (state of the art) allocation, since the communication load for safety applications is now moved to the SafetyCH Interval and therefore the CCH interval only needs to support control messaging for service applications.

Allocation for single-radio devices always on the safety channel is now described.

The always-on Single-radio devices stay always on the safety channel for transmitting and receiving packets/messages of safety applications.

Figure 4:
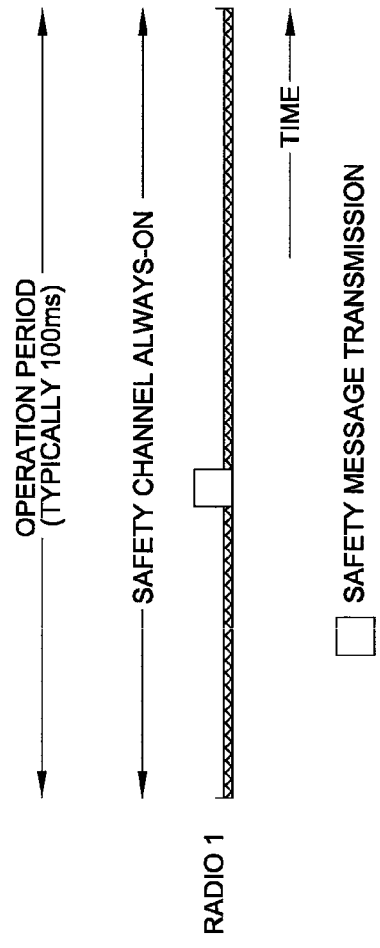
FIG. 4 illustrates channel operations of the single-radio devices that are always on the safety channel.
Figure 4:

FIG. 4 shows the newly proposed channel operation within an operation period for the single radio devices 402 that are always on the safety channel.

Allocation for dual-radio devices is now described.

Figure 5:
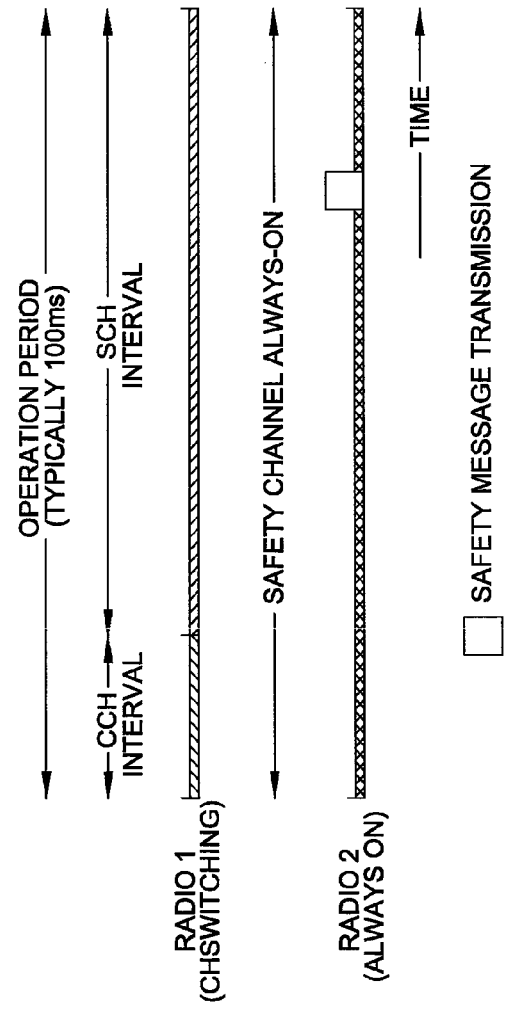
FIG. 5 illustrates a proposed allocation of channel operation intervals within an operation period for the dual-radio devices that are performing channel switching on the CCH and SCH on one radio and are always on the safety channel on the other radio.
Figure 5:

FIG. 5 shows the proposed allocation of channel operation interval, within an operation period for the dual-radio devices 502 that are performing channel-switching on the CCH and SCH on one radio and are always on the Safety Channel on the other radio. The CCH interval of the dual-radio devices is set to equal to the CCH interval of the single-radio devices that perform channel switching. The SCH interval of the dual-radio devices is the rest of the operation period excluding its CCH Interval.

Figure 6:
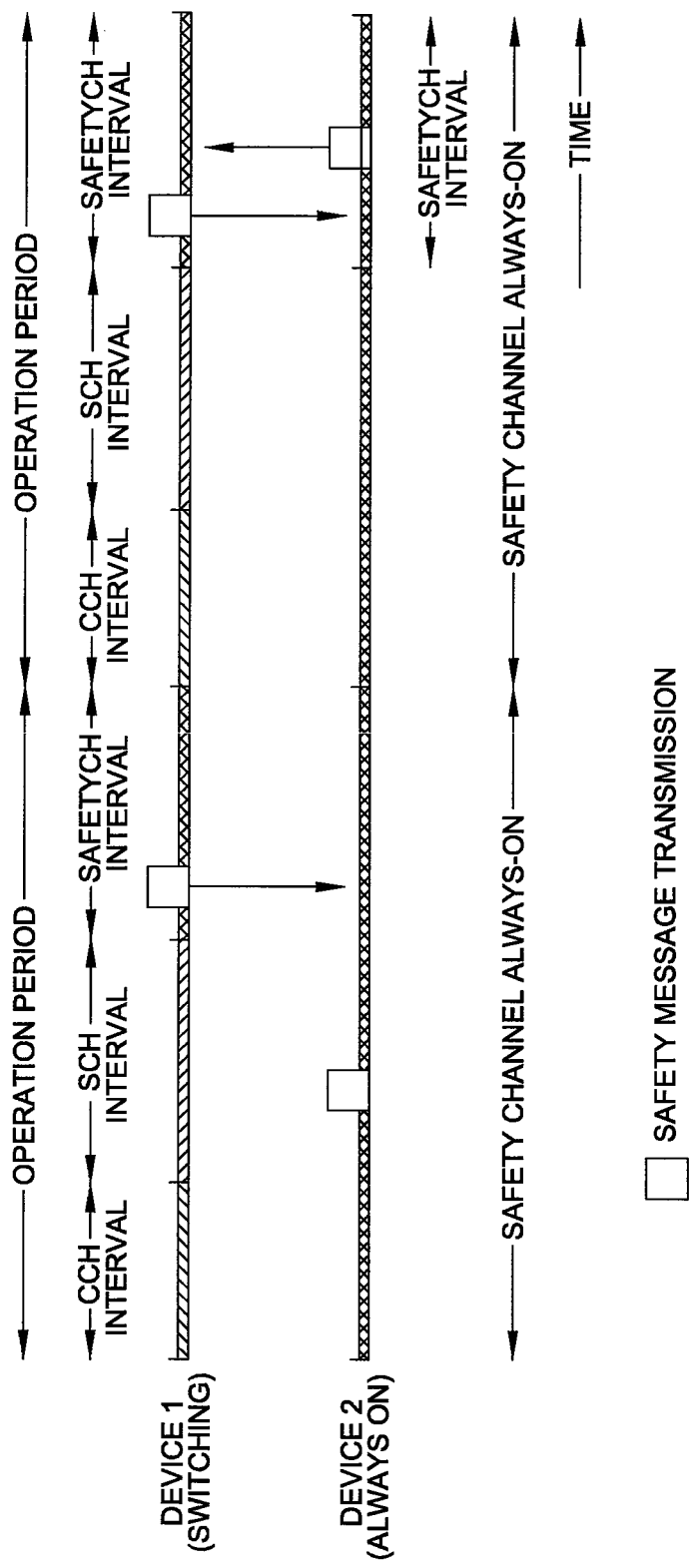
FIG. 6 illustrates interoperations between single-radio (channel switching) devices and single-radio (always-on) devices.

Referring now to FIG. 6, the method according to the present invention for interoperations between single-radio (channel switching) devices and single-radio (always-on) devices is now described:

1) Single-radio (always-on) devices keep announcing safety messages on the safety channel at any time and keep monitoring packet transmissions on the safety channel at all times when it not transmitting. This operation mode is called the "Normal Mode".

2) Single-radio (channel switching) devices announce safety messages on the safety channel and keep monitoring packet transmissions on the safety channel during the Safety Channel Interval.

3) Once a single-radio (always-on) device detects the existence of a single-radio (channel-switching) device after successfully receiving at least one safety message transmitted by the single-radio (channel-switching) device during the safety channel interval, it enters to the "Interoperation Mode", in which the single-radio (always-on) device shall transmit safety messages at least during the safety channel interval of the single-radio (channel-switching) device. Note that the safety channel interval of the single-radio (channel-switching) device must be well-known/standardized. The devices that can directly communicate with one another are called "One-Hop" neighbors.

4) A single-radio (always-on) device that does not detect any single-radio (channel-switching) device (i.e. the device being outside of the One-Hop neighborhood) can stay in the "Normal" mode.

5) Single-radio (channel switching) devices operate as usual.

Figure 7:
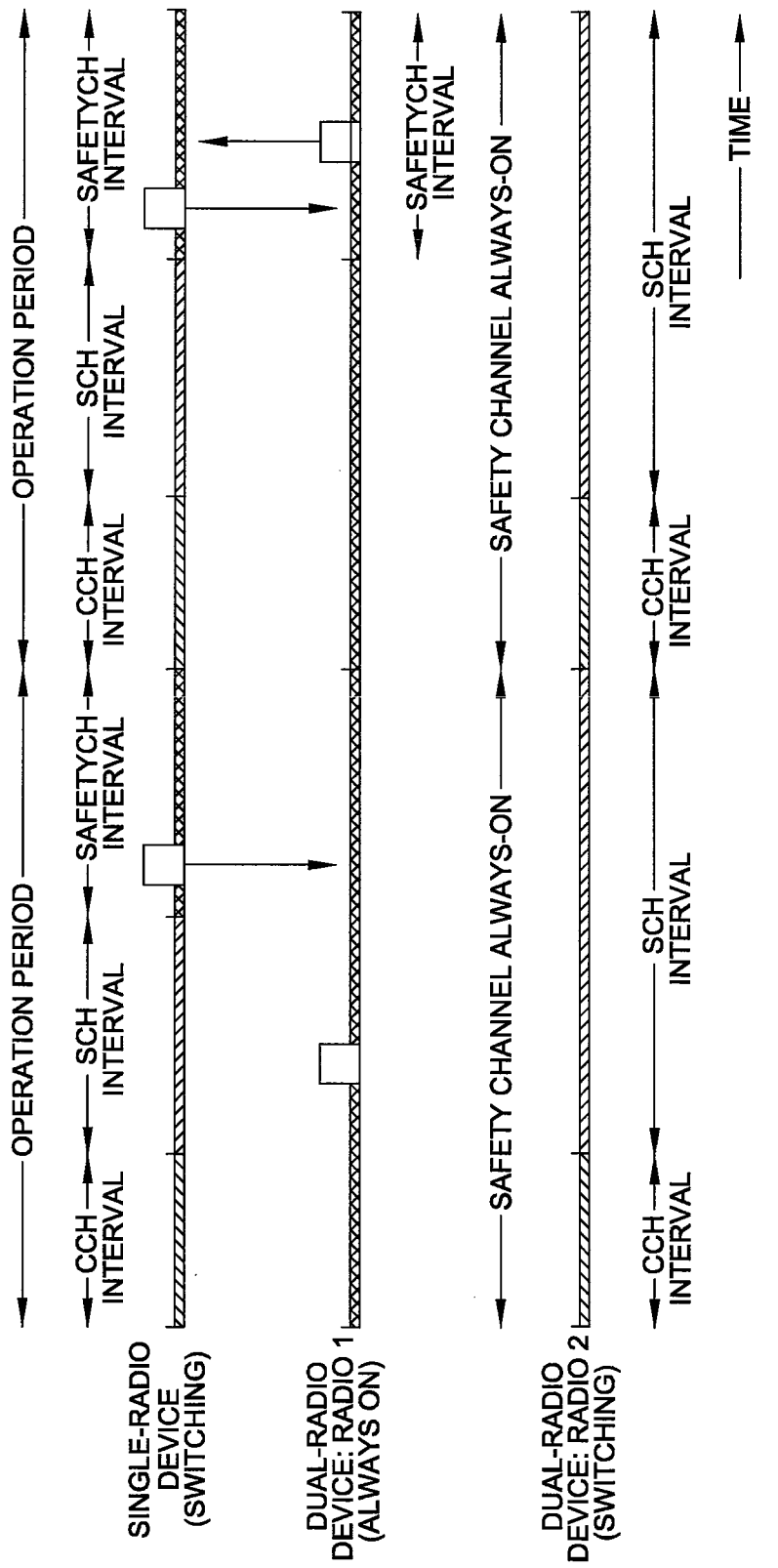
FIG. 7 illustrates interoperations between single-radio (channel switching) devices and dual-radio devices—switching from the normal mode to the interoperation mode.

Referring now to FIG. 7, interoperations between single-radio (channel switching) devices and dual-radio devices is now described:

1) A dual-radio device uses one of its two radios to keep announcing safety messages on the safety channel at any time and keep monitoring packet transmissions on the safety channel at all time when it is not transmitting. This radio is called the "always on safety channel" radio. It uses the other radio (called channel switching radio) that switching between the control channel and the service channel to support data services. This operation mode is called the "Normal Mode" of the dual devices.

2) Single-radio (channel switching) devices announce safety messages on the safety channel and keep monitoring packet transmissions on the safety channel during the safety channel interval.

3) Once a dual radio device detects the existence of a single-radio (channel-switching) device by successfully receiving at least one safety message on the safety channel transmitted by the single-radio (channel-switching) device during the safety channel interval of the single radio (channel switching) devices, it enters to the "Interoperation Mode", in which the dual radio device shall transmit safety messages at least during the safety channel interval of the single-radio (channel-switching) device. Such single-radio (channel-switching) devices detection can also be done by successfully receiving at least one control packets on the control channel transmitted by the single-radio (channel-switching) device during the fully synchronized CCH interval. The devices that can directly communicate with one another are called "One-Hop" neighbors. In the interoperation mode, the dual-radio device uses its "channel switching" radio to exchange control packets on the control channel with the single-radio (channel-switching) devices within the "One-Hop" neighborhood during the fully synchronized CCH interval. It shall exchange service packets on the service channel with the single-radio (channel-switching) devices within the "One-Hop" neighborhood during the SCH interval of the single-radio (channel-switching) devices. Note that the safety channel interval, CCH interval, and the SCH interval of the single-radio (channel-switching) device must be well-known/standardized.

4) A dual device that does not detect any single-radio (channel-switching) device (i.e. the device being outside of the One-Hop neighborhood) can stay in the "Normal" mode.

5) Single-radio (channel switching) devices operate as usual.

Figure 8:
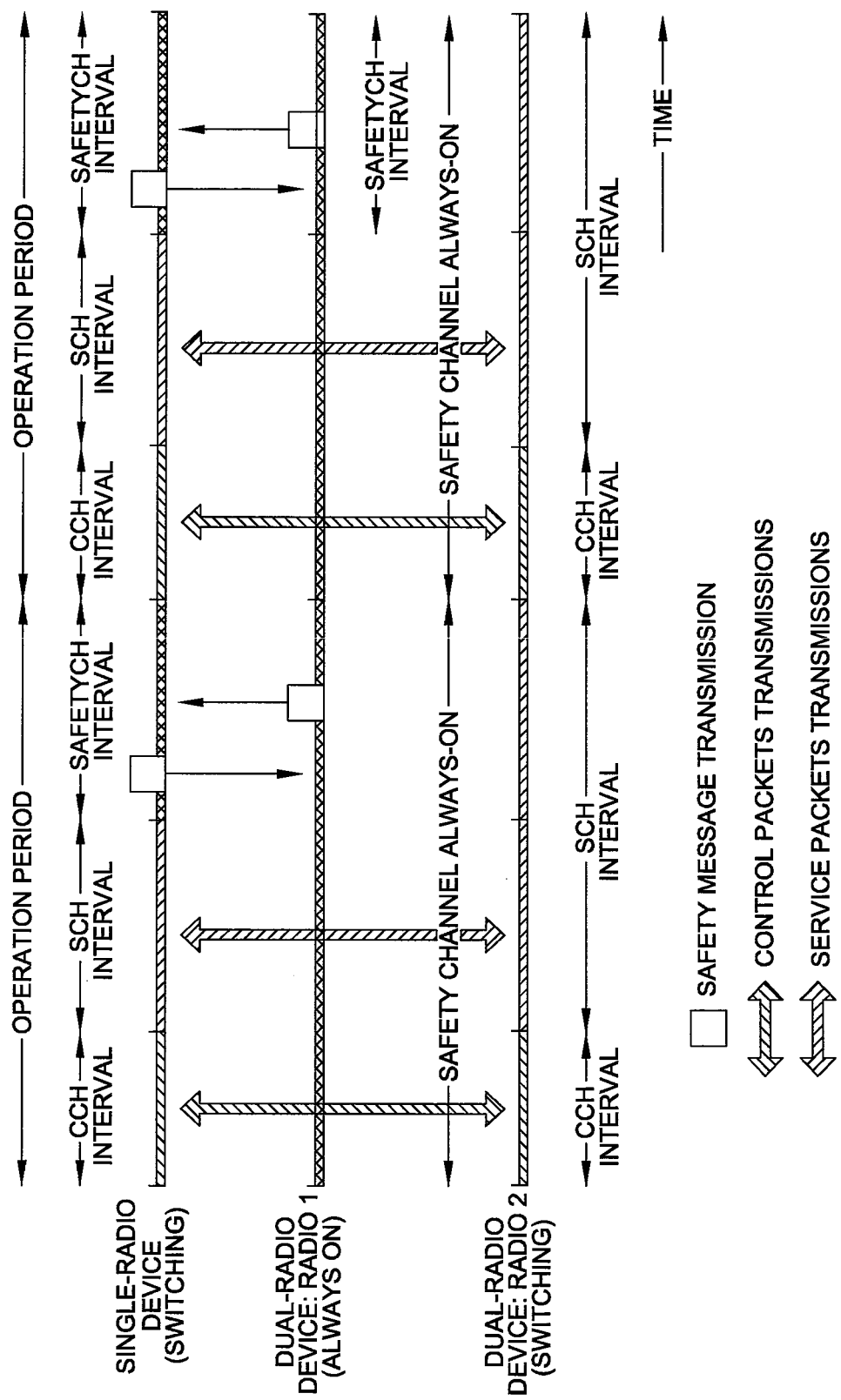
FIG. 8 illustrates interoperations between single-radio (channel switching) devices and dual-radio devices—communications in the interoperation mode on the safety channel, control channel, and service channel.
Figure 9:
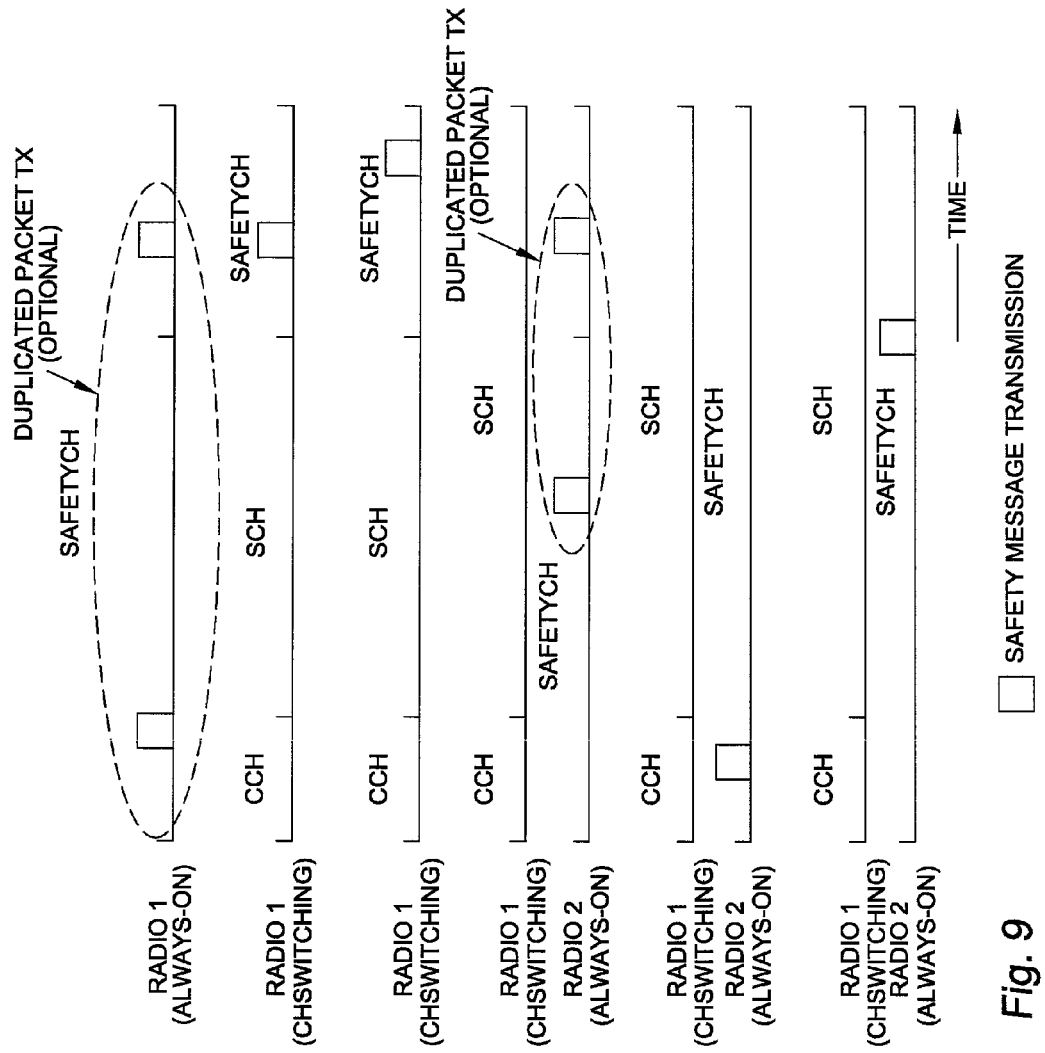
FIG. 9 illustrates enabling dual-single radio devices interoperability using duplicated packet transmissions.
Figure 9:
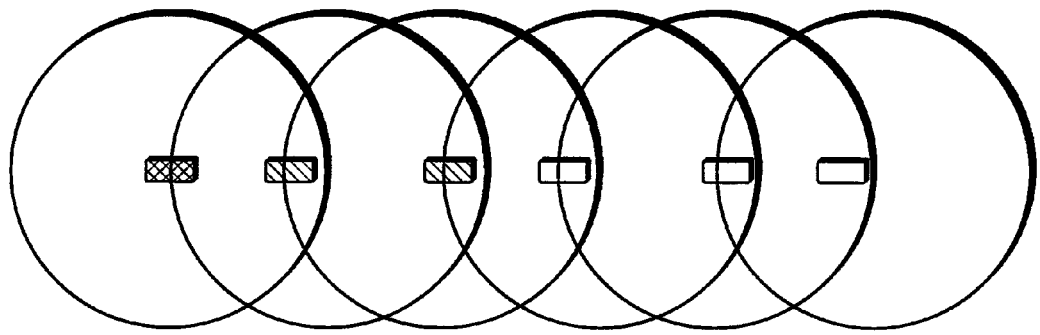

An example of interoperability among different device types when a safety channel is available is shown in FIGS. 8 and 9. FIG. 8 illustrates interoperations between single-radio (channel switching) devices and dual radio devices—communications in the interoperation mode on the safety channel, control channel, and service channel. FIG. 9 illustrates enabling dual-single radio devices interoperability using duplicated packet transmissions.

Interoperability when the safety channel is not available is now described. When the safety channel is not available under a regulatory domain, only the control channel and the service channels can be used. All safety applications, together with the control applications, will use the control channel.

Therefore the types of devices that need to be interoperable in this case are dual-radio devices that are (Radio 1) always on the control channel for the communications of safety applications and control for service applications; and (Radio 2) are always on the service channel to support data services. Single-radio devices that are always on the control channel and single-radio devices that are switching between the control channel, and the service channel must also be interoperable.

A proposed scheme for interoperability including channel interval allocation according to the present invention is now described. Channel interval allocation for single-, radio devices performing channel switching is initially described.

Figure 10:
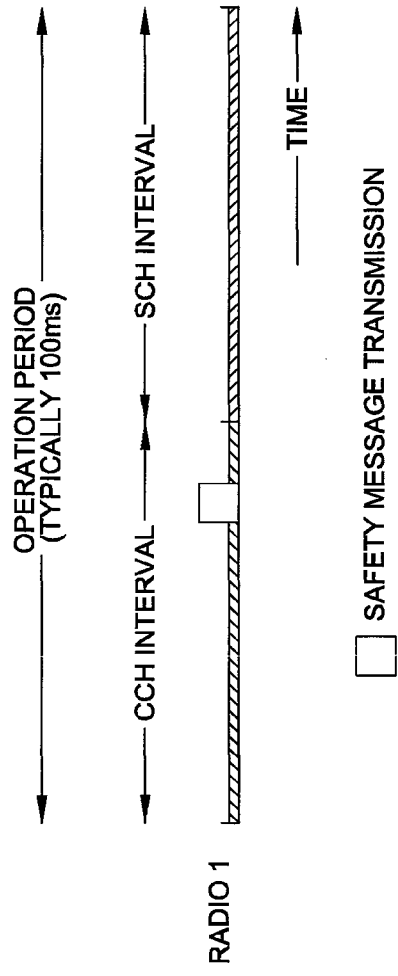
FIG. 10 illustrates current (state of the art) allocation of channel operation intervals within an operation period for the single-radio devices performing channel switching.
Figure 10:
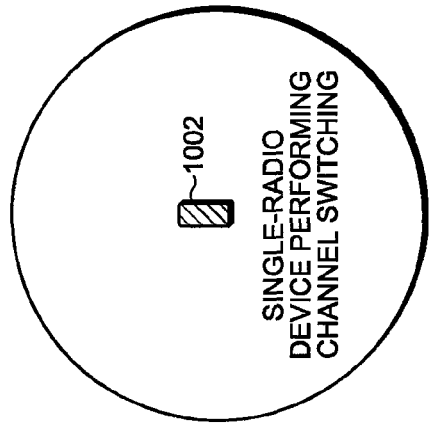
Figure 11:
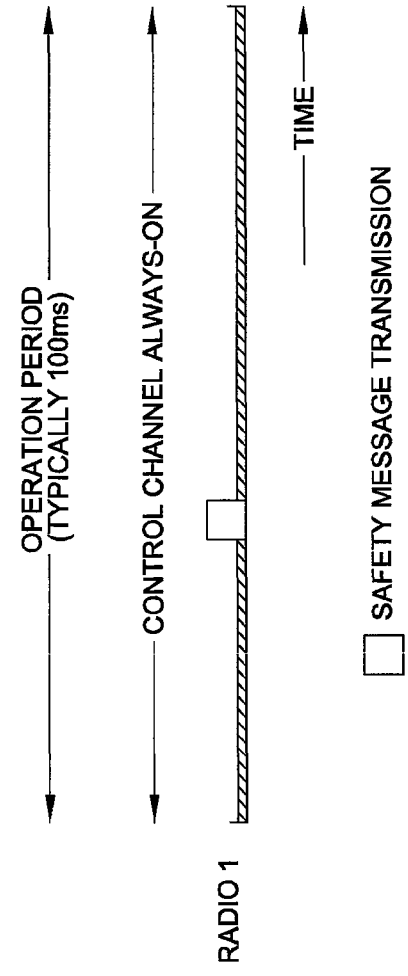
FIG. 11 illustrates channel operation of the single-radio devices that are always on the control channel.
Figure 11:

FIG. 10 shows the current allocation of channel operation interval within an operation period for the single-radio devices 1002 that perform channel-switching. Operation intervals for the control channel and the service channel are allocated (i.e. CCH interval and SCH interval). Communications for supporting safety applications are conducted within the CCH interval, mixing with communications for supporting services applications (on the control channel).

Channel allocation for single-radio devices always on the control channel is now described. The always-on single-radio devices stay always on the control channel for transmitting and receiving packets/messages of safety applications. FIG.

11 shows the channel operation within an operation period for the single radio devices 1102 that are always on the control channel.

Figure 12:
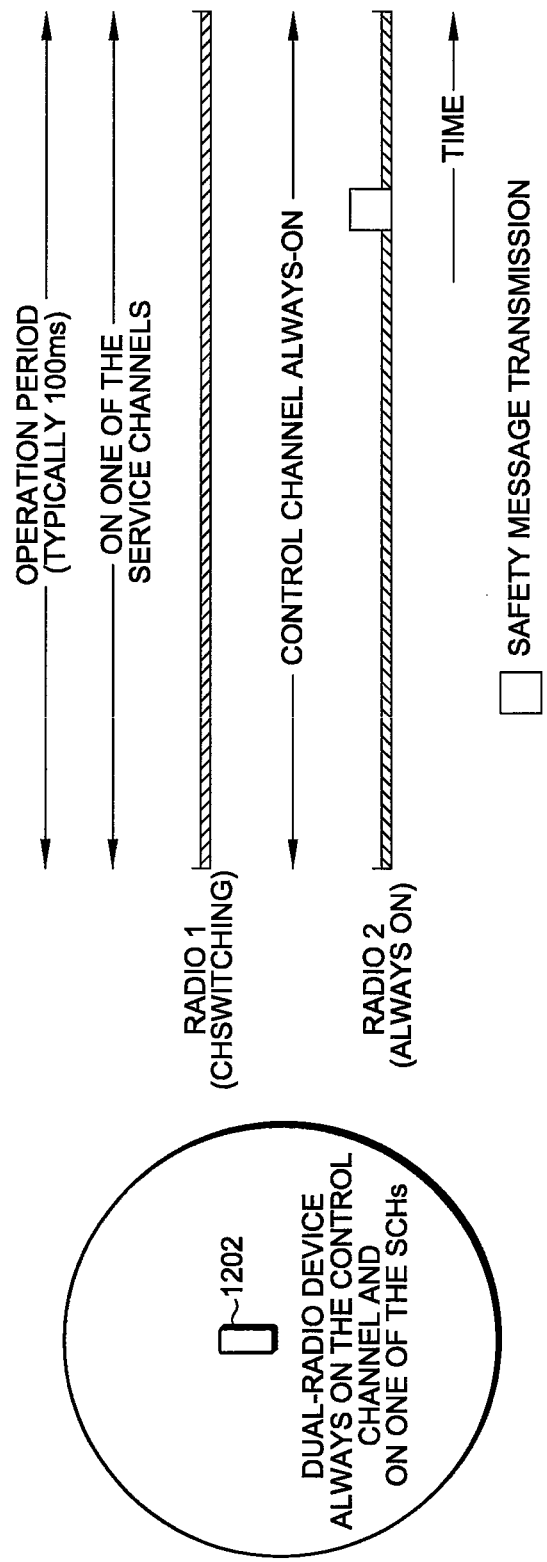
FIG. 12 illustrates allocation of channel operation intervals within an operation period for the dual-radio devices that are always on the CCH with one radio and on one of the SCHs on the other radio.

Allocation for dual-radio devices is now described. FIG. 12 shows the allocation of channel operation interval within an operation period for the dual-radio devices 1202 operating on the control channel and the service channels. Every dual-radio device stays always on the control channel (CCH) with one of its radios and on one of the service channels (SCHs) with the other radio.

Interoperation procedures according to the present invention are now described in further detail.

Figure 13:
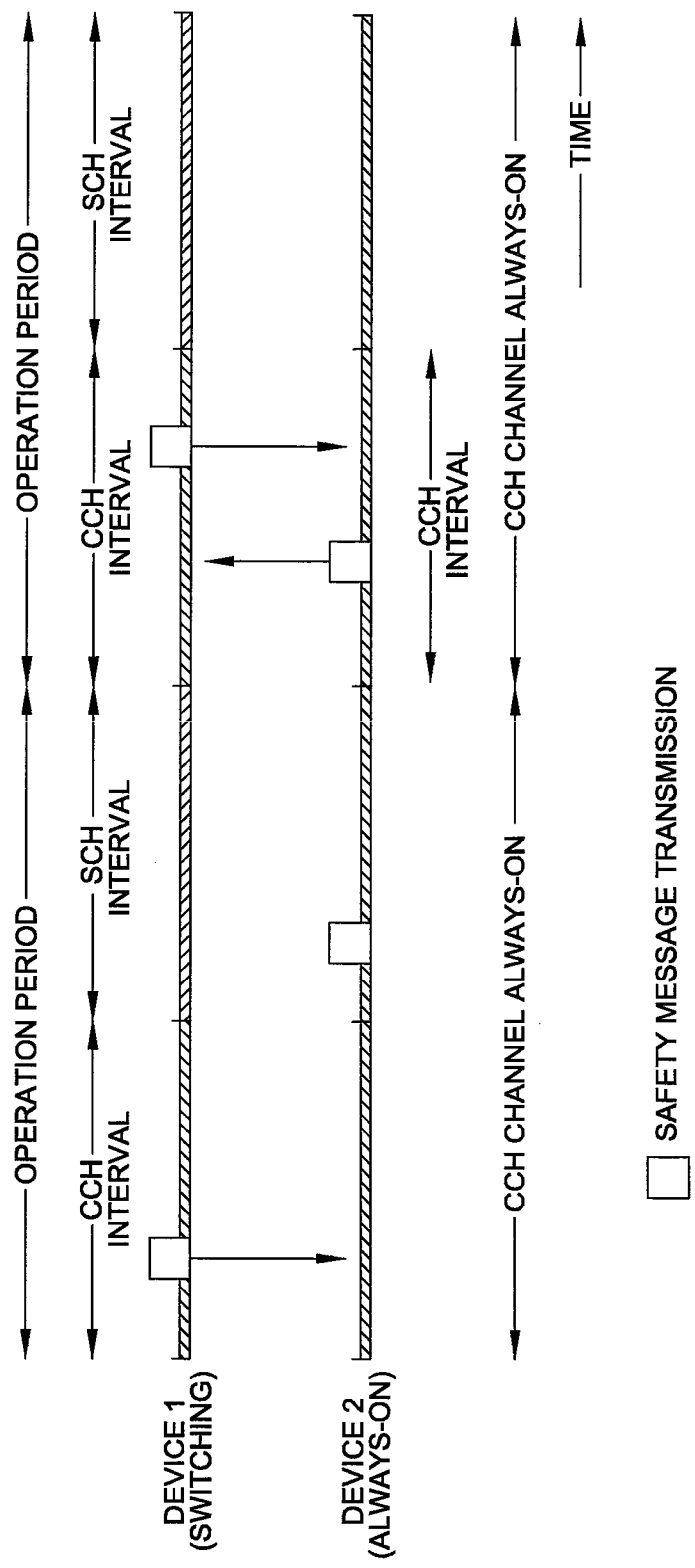
FIG. 13 illustrates interoperations between single-radio (channel switching) devices and single-radio (always-on) devices.

Interoperations between single-radio (channel switching) devices and single-radio (always-on) devices is now described with respect to FIG. 13:

1) Single-radio (always-on) devices keep announcing safety messages on the control channel at any time and keep monitoring packet transmissions on the control channel at all time when it is not transmitting. This operation mode is called the "Normal Mode".

2) Single-radio (channel switching) devices announce safety messages on the control and keep monitoring packet transmissions on the control channel during the Safety Channel Interval when it is not transmitting.

3) Once a single-radio (always-on) device detects the existence of a single-radio (channel-switching) device after successfully receiving at least one safety message transmitted by the single-radio (channel-switching) device during the CCH Interval of the single-radio (channel-switching) device, it enters to the "Interoperation Mode", in which the single-radio (always-on) device shall transmit safety messages at least during the CCH Interval of the single-radio (channel-switching) device. Note that the CCH Interval of the single-radio (channel-switching) device must be well-known/standardized. The devices that can directly communicate with one another are called "One-Hop" neighbors.

4) A single-radio (always-on) device that does not detect any single-radio (channel-switching) device (i.e. the devices being outside of the One-Hop neighborhood) can stay in the "Normal" mode.

5) Single-radio (channel switching) devices operate as usual.

Figure 14:
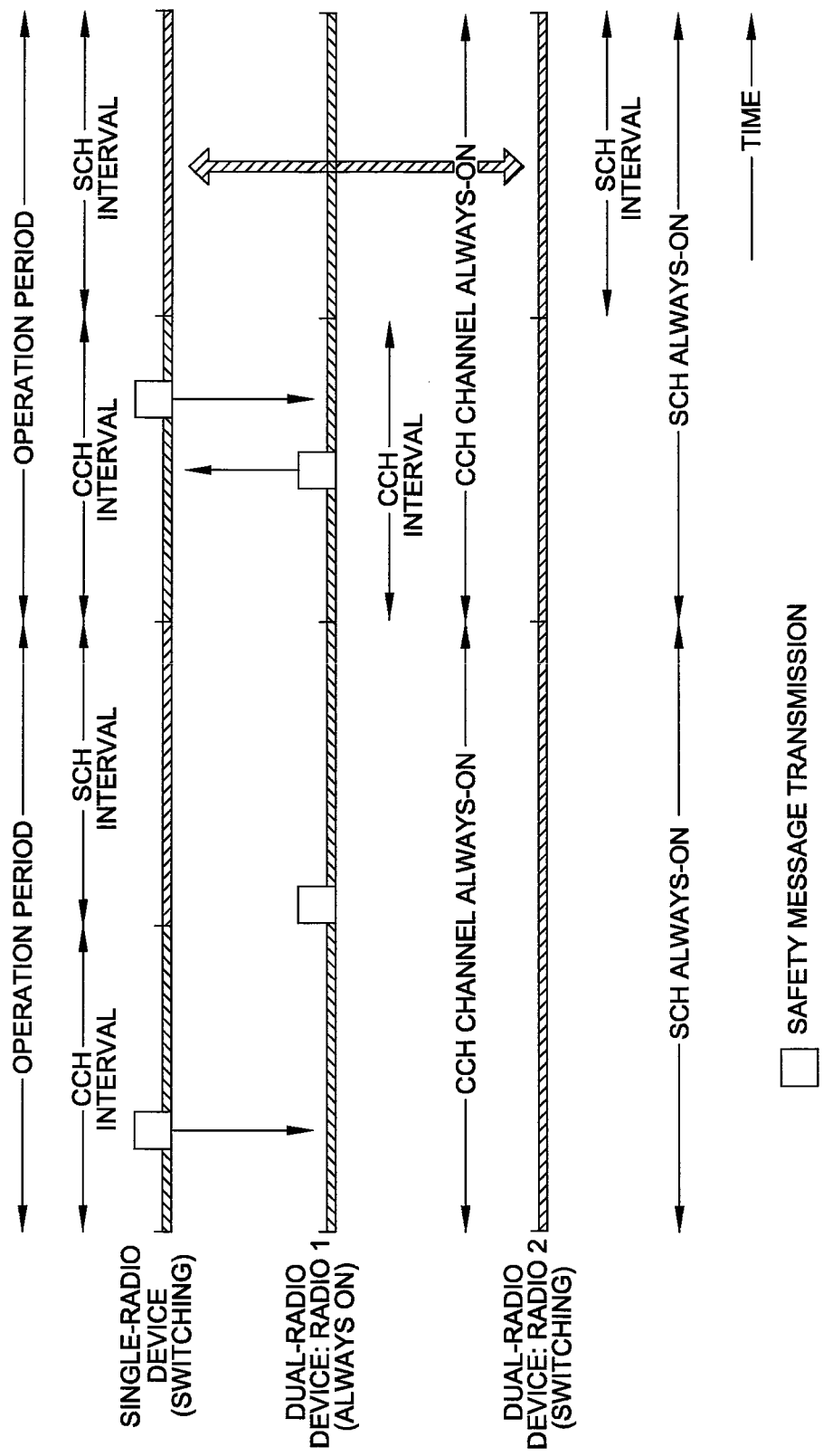
FIG. 14 illustrates interoperations between single-radio (channel switching) devices and dual-radio devices—switching to the interoperation mode and communications in the interoperation mode on the control channel and service channel.

Interoperations between single-radio (channel switching) devices and dual-radio devices is now described with respect to FIG. 14:

1) A dual-radio device uses one of its two radios to keep announcing safety messages on the CCH at any time and keep monitoring packet transmissions on the CCH at all time when it is not transmitting. This radio is called the "always on CCH" radio. It uses the other radio (called "always on SCH" radio) that stays on the SCH to support data services. This operation mode is called the "Normal Mode" of the dual devices.

2) Single-radio (channel switching) devices announce safety messages on the CCH and keep monitoring packet transmissions on the CCH during the CCH interval.

3) Once a dual radio device detects the existence of a single-radio (channel-switching) device by successfully receiving at least one safety message on the CCH transmitted by the single-radio (channel-switching) device during the CCH Interval of the single radio (channel switching) devices, it enters to the "Interoperation Mode", in which the dual radio device shall transmit safety messages at least during the CCH Interval of the single-radio (channel-switching) device. The devices that can directly communicate with one another are called "One-Hop" neighbors. In the interoperation mode, the dual-radio device shall exchange service packets on the service channel with the single-radio (channel-switching) devices within the "One-Hop" neighborhood during the SCH interval of the single-radio (channel-switching) devices. Note that the CCH Interval, and SCH interval of the single-radio (channel-switching) device must be well-known/standardized.

4) A dual device that does not detect any single-radio (channel-switching) device (i.e. the device being outside of the One-Hop neighborhood) can stay in the "Normal" mode.

5) Single-radio (channel switching) devices operate as usual.

Figure 15:
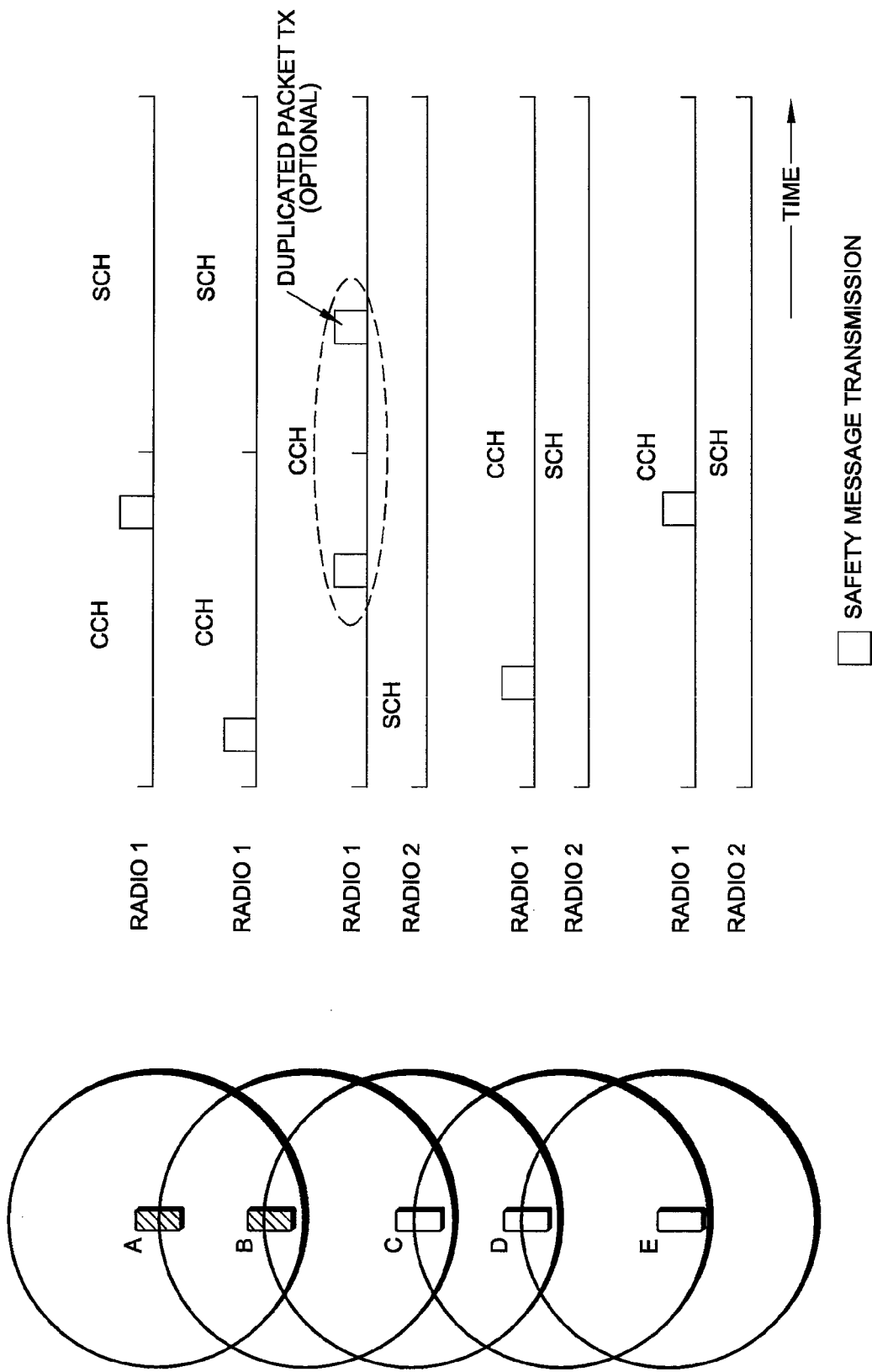
FIG. 15 illustrates interoperability among different device types when the safety channel is not available.

An example of interoperability among different device types when a safety channel is not available is shown in FIG. 15. A single-radio device announces its device type. A "Safety Channel Interval" is added to enable the necessary interoperability among different devices. Only the behavior of the dual-radio device that is within a one-hop neighborhood of a single-radio device needs to be changed. Duplicated messages are transmitted optionally to enhance message reception probability. Desirable CCH/SCH splitting can be achieved in the dual-radio devices to support favorable services.

In a regulatory domain where a dedicated safety channel is available, it is recommended to use the procedures described above including a safety channel. In a regulatory domain where a dedicated safety channel is not available, it is recommended to use the procedures described above not including a safety channel.

While there have been described above the principles of the present invention, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A method for interoperations between a single-radio channel switching (SR-CS) device and a single-radio always-on (SR-AO) device in a radio communication system comprising a safety channel, the method comprising:

operating the SR-AO device in a normal mode wherein the SR-AO device transmits safety messages on the safety channel at any time during operation intervals and monitors packet transmissions on the safety channel at all times when it is not transmitting;

operating the SR-CS device on the safety channel during safety channel intervals within operation intervals to transmit safety messages and to monitor for packet transmissions; and responsive to detection by the SR-AO device of a safety message transmitted by the SR-CS device during one of the safety channel intervals, switching the SR-AO device to an interoperation mode, in which the SR-AO device transmits safety messages at least during the safety channel intervals of the operation intervals.

2. A method for interoperations between a single-radio channel switching (SR-CS) device and a dual radio (DR) device in a radio communication system comprising a safety channel, a control channel and a service channel, the method comprising:

operating the DR device in a normal mode wherein a first radio of the DR device transmits safety messages on the safety channel at any time during operation intervals and monitors packet transmissions on the safety channel at all times when it is not transmitting, and wherein the second radio of the DR device uses the control channel and the service channel to support data services;

operating the SR-CS device on the safety channel during safety channel intervals within operation intervals to transmit safety messages and to monitor packet transmissions; and responsive to detection by the DR device of a SR-CS device, switching the DR device to an interoperation mode, in which the DR device transmits safety messages using the first radio at least during the safety channel intervals of the operation intervals.

3. The method of claim 2, wherein the DR device detects the SR-CS device by receiving on the first radio a safety message on the safety channel transmitted by the SR-CS device.

4. The method of claim 2 further comprising synchronization between the SR-CS device and the second radio of the DR device of Control Channel Intervals within the operation intervals.

5. The method of claim 4, wherein the DR device detects the SR-CS device by receiving a control packet transmitted by the SR-CS device during the synchronized Control Channel Intervals.

6. The method of claim 4, wherein within an operation interval the DR device transmits duplicated packet safety messages on the safety channel both during the safety channel interval and the Control Channel Interval.

7. A method for interoperations between a single-radio channel switching (SR-CS) device and a single radio always on (SR-AO) device in a radio communication system comprising a control channel and a service channel, the method comprising:

operating the SR-AO device in a normal mode wherein the SR-AO device transmits safety messages on the control channel at any time during an operation interval and monitors packet transmissions on the control channel at all times when it is not transmitting;

operating the SR-CS device so that the operation interval comprises a Control Channel Interval and a Service Channel Interval, so that the SR-CS device transmits safety messages on the control channel during the Control Channel Interval, and so that the SR-CS device monitors packet transmissions on the control channel during the Service Channel Interval; and responsive to detection by the SR-AO device of a SR-CS device by the SR-AO device receiving a safety message transmitted by the SR-CS, switching the SR-AO device to an interoperation mode, in which the SR-AO device transmits safety messages at least during the Control Channel Interval of the SR-CS device.

8. A method for interoperations between a single-radio channel switching (SR-CS) device and a dual radio (DR) device in a radio communication system comprising a control channel and a service channel, the method comprising:

operating the DR device in a normal mode wherein a first radio of the DR device transmits safety messages on the control channel at any time during operation intervals and monitors packet transmissions on the control channel at all times when it is not transmitting, and wherein a second radio of the DR device stays on the service channel to support data services;

operating the SR-CS device to transmit safety messages on the control channel and to continuously monitor packet transmissions on the control channel; and responsive to detection by the DR device of a SR-CS device by receiving a safety message on the control channel transmitted by the SR-CS, switching the DR device to an interoperation mode in which the DR device transmits safety messages using the first radio at least during control intervals within the operation intervals of the SR-CS.

9. A radio communication system comprising:

a safety channel, a control channel, and a service channel;

a single-radio always on (SR-AO) device; and a single-radio channel switching (SR-CS) device;

wherein the SR-AO device operates in a normal mode by which it transmits safety messages on the safety channel at any time during operation intervals and monitors packet transmissions on the safety channel at all times when it is not transmitting;

wherein the SR-CS device operates on the safety channel during safety channel intervals within operation intervals to transmit safety messages and to monitor packet transmissions; and wherein responsive to detection by the SR-AO device of a safety message transmitted by the SR-CS device during one of the safety channel intervals, the SR-AO device switches to an interoperation mode in which the SR-AO device transmits safety messages at least during the safety channel intervals of the operation intervals.

10. A radio communication system comprising:

a safety channel, a control channel, and a service channel;

a dual radio (DR) device; and a single-radio channel switching (SR-CS) device;

wherein the DR device operates in a normal mode by which a first radio of the DR device transmits safety messages on the safety channel at any time during operation intervals and monitors packet transmissions on the safety channel at all times when it is not transmitting, and wherein the second radio of the DR device uses the control channel and the service channel to support data services;

wherein the SR-CS device operates on the safety channel during safety channel intervals within operation intervals to transmit safety messages and to monitor packet transmissions; and wherein the DR device, responsive to detection of a SR-CS device, switches to an interoperation mode, in which the DR device transmits safety messages using the first radio at least during the safety channel intervals of the operation intervals.

11. The system of claim 10, wherein the DR device detects the SR-CS device by receiving on the first radio a safety message on the safety channel transmitted by the SR-CS device.

12. The system of claim 10 further comprising synchronization between the SR-CS device and the second radio of the DR device of Control Channel Intervals within operation intervals.

13. The system of claim 12 wherein the DR device detects the SR-CS device by receiving a control packet transmitted by the SR-CS device during the synchronized Control Channel Intervals.

14. The system of claim 12, wherein within an operation interval the DR device transmits duplicated packet safety messages on the safety channel both during the safety channel interval and the Control Channel Interval.

15. A radio communication system comprising:
a control channel, and a service channel;
a single-radio always on (SR-AO) device; and
a single-radio channel switching (SR-CS) device;
wherein the SR-AO device operates in a normal mode by which it transmits safety messages on the safety channel at any time during an operation interval and monitors packet transmissions on the safety channel at all times when it is not transmitting;
wherein the SR-CS device operates so that the operation interval comprises a Control Channel Interval and a Service Channel Interval, so that the SR-CS device transmits safety messages on the control channel during the Control Channel Interval, and so that the SR-CS device monitors packet transmissions on the control channel during the Service Channel Interval; and
wherein the SR-AO device, responsive to detection of a SR-CS device, switches to an interoperation mode, in which the SR-AO device transmits safety messages at least during the Control Channel Interval of the SR-CS device.

16. A radio communication system comprising:
a control channel, and a service channel;
a dual radio (DR) device; and
a single-radio channel switching (SR-CS) device;
wherein the DR device operates in a normal mode wherein a first radio of the DR device transmits safety messages on the control channel at any time during operation intervals and monitors packet transmissions on the control channel at all times when it is not transmitting, and wherein a second radio of the DR device stays on the service channel to support data services;
wherein the SR-CS device transmits safety messages on the control channel and continuously monitors packet transmissions on the control channel; and
wherein the DR device, responsive to detection of a SR-CS device by receiving a safety message transmitted by the SR-CS on the control channel, switches into an interoperation mode, in which the DR device transmits safety messages using its first radio at least during control intervals within the operation intervals of the SR-CS.

* * * * *